United States Patent [19]

Sato

[11] Patent Number: 5,715,252
[45] Date of Patent: Feb. 3, 1998

[54] HIGH RATE DATA TRANSMISSION CIRCUIT

[75] Inventor: Shunji Sato, Tokyo, Japan

[73] Assignee: NEC Corporation, Japan

[21] Appl. No.: 346,388

[22] Filed: Nov. 29, 1994

[30] Foreign Application Priority Data

Nov. 29, 1993 [JP] Japan .................. 5-297679

[51] Int. Cl.$^6$ .................................. H04J 3/22
[52] U.S. Cl. .................. 370/543; 370/538; 370/914; 375/260; 341/61; 341/100; 341/101; 395/891
[58] Field of Search .................. 375/260, 257, 375/295, 288, 225; 370/536, 538, 540, 545, 543, 914; 341/61, 100, 101; 395/891

[56] References Cited

U.S. PATENT DOCUMENTS

| | | | |
|---|---|---|---|
| 4,225,752 | 9/1980 | Looschen | 370/1 |
| 4,229,623 | 10/1980 | Looschen | 370/4 |
| 4,775,987 | 10/1988 | Miller | 375/38 |
| 4,941,153 | 7/1990 | Kelley et al. | 375/36 |
| 5,065,396 | 11/1991 | Castellano et al. | 370/84 |
| 5,291,515 | 3/1994 | Uchida et al. . | |
| 5,293,378 | 3/1994 | Shimizu | 370/94.1 |
| 5,384,775 | 1/1995 | Sheppard | 370/543 |

*Primary Examiner*—Wellington Chin
*Assistant Examiner*—Jean B. Corrielus
*Attorney, Agent, or Firm*—Ostrolenk, Faber, Gerb & Soffen, LLP

[57] ABSTRACT

A 1:N divider 40 divides an input high rate data signal into N (N being 2 or greater integer) division data signals. Data transmission rate converters $70_1$–$70_N$ for converting the transmission rate of each of the N division data signals. The respective N division data signals are transmitted through N transmission lines $30_1$–$30_n$. A multiplier 50 multiplies the transmitted N division data signals into a single high rate data signal.

4 Claims, 4 Drawing Sheets

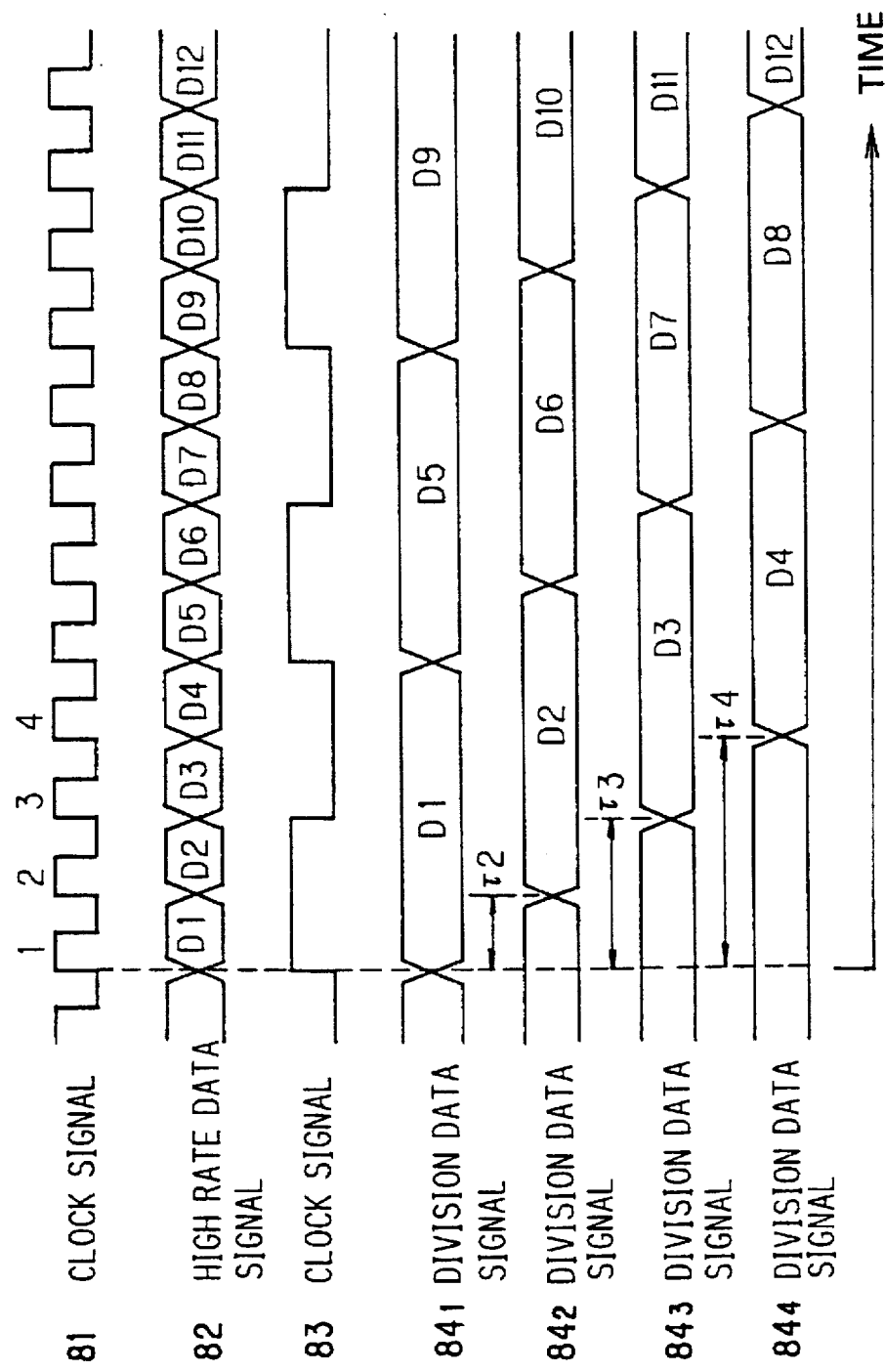

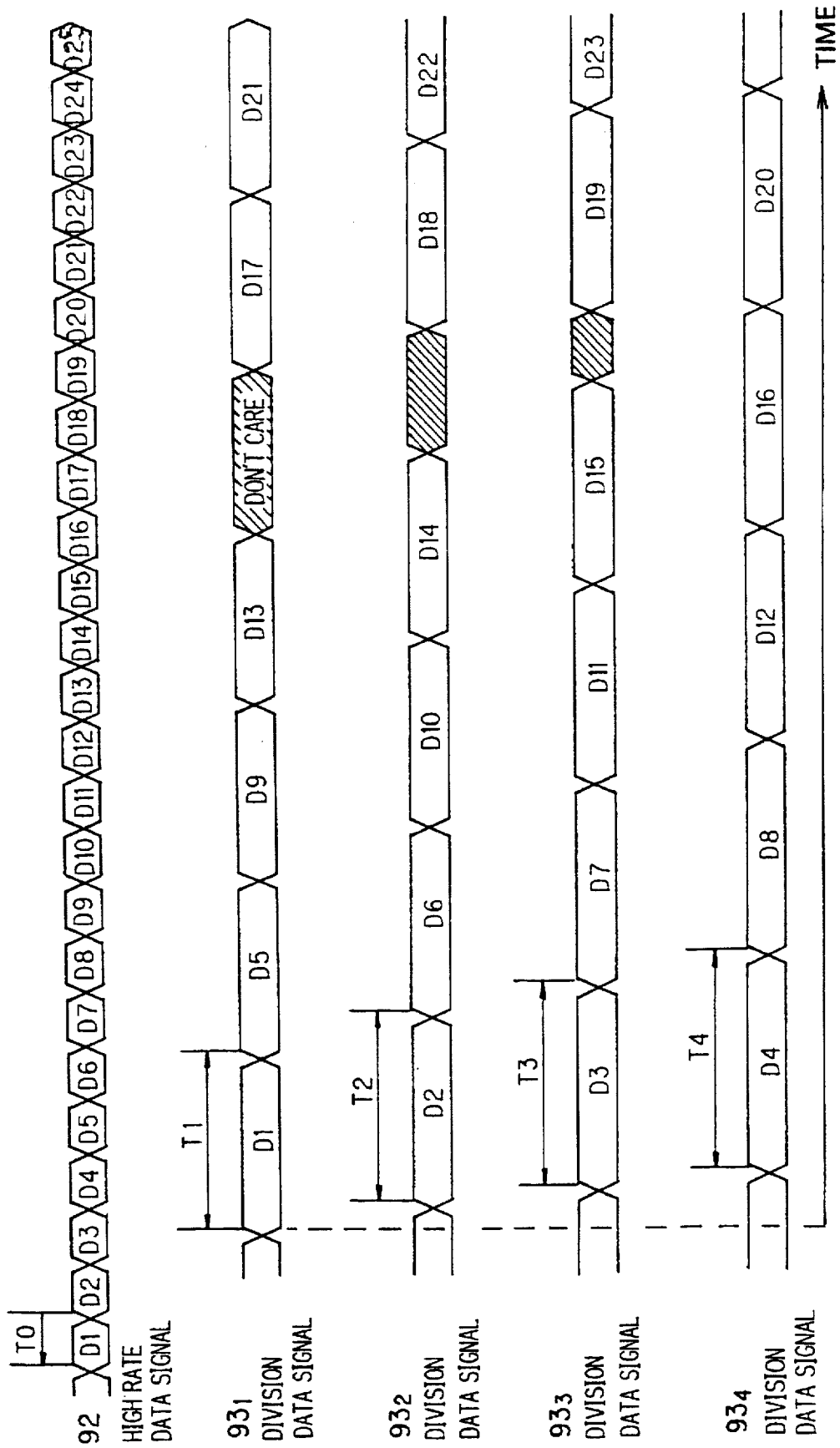

HIGH RATE DATA TRANSMISSION CIRCUIT

BACKGROUND OF THE INVENTION

The present invention relates to a high rate data transmission circuit and, more particularly, to improvements in radiated noise reducing means in the high rate data transmission circuit.

FIG. 6 schematically shows a prior art high rate data transmission circuit. This high rate data transmission circuit has a transmission line 30 connected between an input and an output terminal 10 and 20.

Generally, the radiated noise E in the transmission line is approximately expressed as:

$$E = k \cdot I \cdot A \cdot f^2 \tag{1}$$

where I is a signal current flowed through the transmission line, A is an area of the loop of the signal current I (hereinafter referred to as loop area), f is a frequency of the signal current I, and k is a constant.

Referring to the formula (1), it will be seen that the radiated noise E is increased in proportion to the square of the frequency f of the signal current I, i.e., the square of the data transmission rate through the transmission line. Therefore, concerns about the radiated noise are more serious in a high rate data transmission circuit of a high data transmission rate than in that of a low data transmission rate. It has therefore been desired that the high rate data transmission circuit includes means for reducing the radiated noise. Particularly, the radiated noise reducing means has been desired, which satisfies the Electromagnetic Compatibility (EMC) standard.

As prior art radiated noise reducing means, those for reducing the signal current I or loop area A in the formula (1) have been used.

The prior art radiated noise reducing means, however, are restricted by circuit design circumstances. At present, therefore, it is impossible to obtain the radiated noise reduction such as to satisfy the EMC standard. Where means for reducing the signal current I is used, the minimum required value of the signal current I is prescribed in various data transmission circuits, and it can not be set to be less than the prescribed value. Further, in the circuit design it is required to ensure a signal-to-noise ratio above a certain value with respect to external noise other than the radiated noise in the circuit. Where means for reducing the loop area A is used, the length of the transmission line and the distance between pair electrode lines in the transmission line are both subject to physical restrictions on the circuit design. Therefore, the reduction of the loop area A is subject to limitations.

Due to the restrictions on the circuit design as described above, it is difficult with the prior art radiated noise reducing means to sufficiently reduce the radiated noise in high rate data transmission circuits.

SUMMARY OF THE INVENTION

An object of the present invention is therefore to provide a high rate data transmission circuit capable of sufficient radiated noise reduction.

Another object of the present invention is to provide a high rate data transmission circuit having a radiated noise reducing means free from restrictions on the circuit design.

According to one aspect of the present invention, there is provided a high rate data transmission circuit comprising a 1:N divider for dividing an input high rate data signal into N (N being 2 or greater integer) division data signals, a phase controller for providing a phase to each of the N division data signals, N transmission lines for transmitting the respective N division data signals, and a multiplexer for multiplexing the transmitted N division data signals into a single high rate data signal. The phase controller provides different phases for the respective divided digital data or the same phase for all divided digital data.

According to another aspect of the present invention, there is provided a high rate data transmission circuit comprising a 1:N divider for dividing an input high rate data signal into N (N being 2 or greater integer) division data signals, a data transmission rate converter for converting the transmission rate of each of the N division data signals, and a multiplexer for multiplexing the transmitted N division data signals into a single high rate data signal.

Other objects and features will be clarified from the following description with reference to attached drawings.

BRIEF DESCRIPTION OF THE DRAWINGS

FIG. 3 is a time chart illustrating the operation of the high rate data transmission circuit shown in FIG. 1;

FIG. 5 is a time chart in case where the division number of the high rate data transmission circuit in FIG. 2 is 4.

DETAILED DESCRIPTION OF THE PREFERRED EMBODIMENTS

Preferred embodiments of the high rate data transmission circuit according to the present invention will now be described with reference to the drawings.

Figure 1:
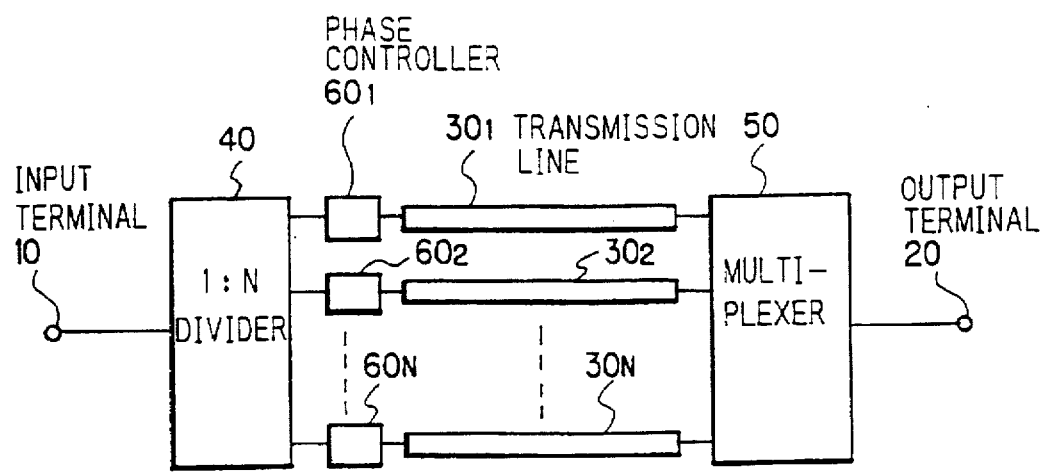
FIG. 1 shows a first embodiment of the high rate data transmission circuit according to the present invention.

FIG. 1 shows a first embodiment of the high rate data transmission circuit according to the present invention.

Referring to the FIG. 1, the first embodiment of the high rate data transmission circuit comprises a 1:N divider 40 for dividing a high rate data signal supplied from a first external circuit (not shown) through an input terminal 10 into N (N being 2 or a greater integer) division data signals, phase controllers $60_1, 60_2, \ldots, 60_N$ each for providing a phase difference to each of the N division data signals, N transmission lines $30_1, 30_2, \ldots, 30_N$ through which the respective division data signals are transmitted, and a multiplexer 50 for multiplexing the individual transmitted division data signals into a single high rate data signal, which is supplied through an output terminal 20 to a second external circuit (not shown). Although in FIG. 1, N is shown to be more than 3 for convenience of the illustrating, N maybe 2 or a greater integer.

FIG. 3 is a time chart illustrating the operation of the high rate data transmission circuit shown in FIG. 1 in a case where the division number is 4, that is, the high rate data signal supplied from the input terminal 10 is divided into four division data.

Referring to FIG. 3, the high rate data signal 82 comprising bit data $D_1, D_2, D_3, \ldots, D_{12}$ supplied from the input terminal 10 is sampled by the 1:N divider 40 under control of a clock signal 81. The high rate data signal 82 is time-divided by the 1:N divider 40 into four division data signals $84_1$ to $84_4$, and the divided data signals are transmitted at a timing given by a clock signal 83. The clock signal 83 has one-fourth the frequency of the clock signal 81. The phase differences between the division data signals $84_1$ and $84_2$, $84_1$ and $84_3$, and $84_1$ and $84_4$, are $\tau_2$, $\tau_3$ and $\tau_4$, respectively. Referring to FIG. 3, it will be seen that the rate of transmission of each of the division data signals $84_1$ to $84_4$ is one-fourth the transmission rate of the high rate data signal 82.

When all the four division data signals are in phase, that is, in a case of $\tau_2=\tau_3=\tau_4=0$ in FIG. 3, the radiated noise E in the first embodiment of the high rate data transmission circuit is given as $$E = k \cdot I_1 \cdot A_1 f^2 + k \cdot I_2 \cdot A_2 f^2 + k \cdot I_3 \cdot A_3 f^2 + k \cdot I_4 \cdot A_4 f^2 \quad (2)$$

where $I_1$ to $I_4$ are signal currents of the division data signals $84_1$ to $84_4$, and $A_1$ to $A_4$ are loop areas of the loops though which the signal currents $I_1$ to $I_4$ are transmitted. The signal currents $I_1$ to $I_4$ of the division data signals are all one-fourth of the signal current I of the high rate data signal 82, i.e., $I_1=I_2=I_3=I_4=I/N$.

Figure 4:
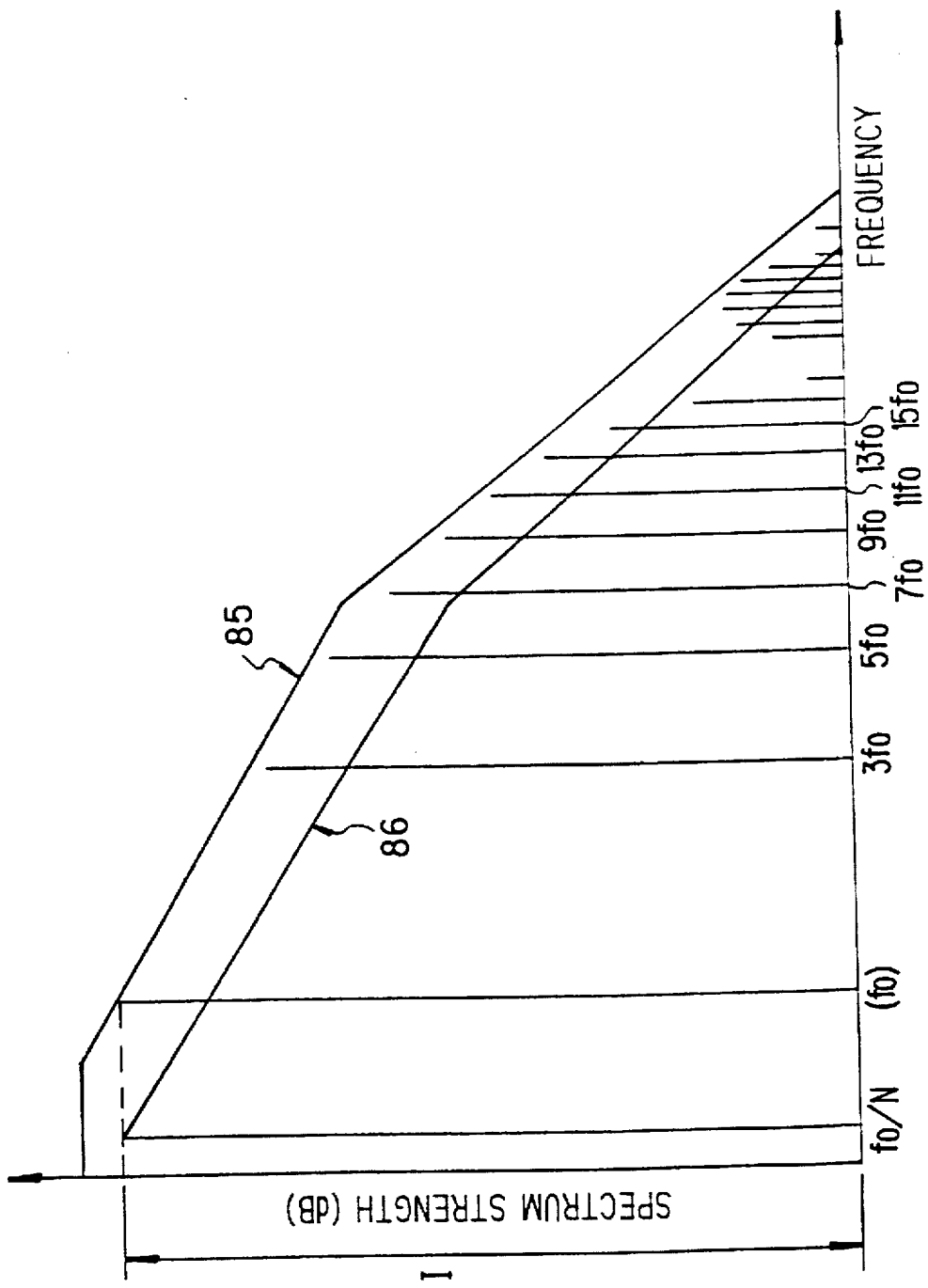
FIG. 4 is a diagram showing a spectrum envelope in case where the high rate data signal 82 and division data signals $84_1$ to $84_4$ in FIG. 3.

FIG. 4 is a diagram showing a spectrum envelope in a case where the high rate data signal 82 and division data signals $84_1$ to $84_4$ in FIG. 3 are rectangle waves. Referring to FIG. 4, spectrum strength 85 shows the spectrum envelope of the high rate data signal 82 (N=1). Spectrum strength 86, on the other hand, shows the spectrum envelope of each of the division data signals $84_1$ to $84_4$.

By applying the signal current relation obtained with reference to FIG. 4 to the above formula (2), the radiated noise E in the first embodiment of the high rate data transmission circuit is given as:

$$E = 1/N \cdot (k \cdot I \cdot A f^2) \quad (3)$$

under an assumption that a condition $A_1=A_2=A_3=A_4=A$.

It will be seen from the formulas (3) and (1) that with the first embodiment of the high rate data transmission circuit according to the present invention, in which the high rate data signal is divided, compared with the prior art example in which the high rate data signal is not divided (i.e., N=1), the radiated noise E is reduced to 1/N (i.e., ¼ in the example of FIG. 3).

Further, in the first embodiment the radiated noise E is less than 1/N because the phases of the individual division data signals are shifted to be $\tau_2 \neq \tau_3 \neq \tau_3 \neq \tau_4 \neq \tau_2$.

Figure 2:
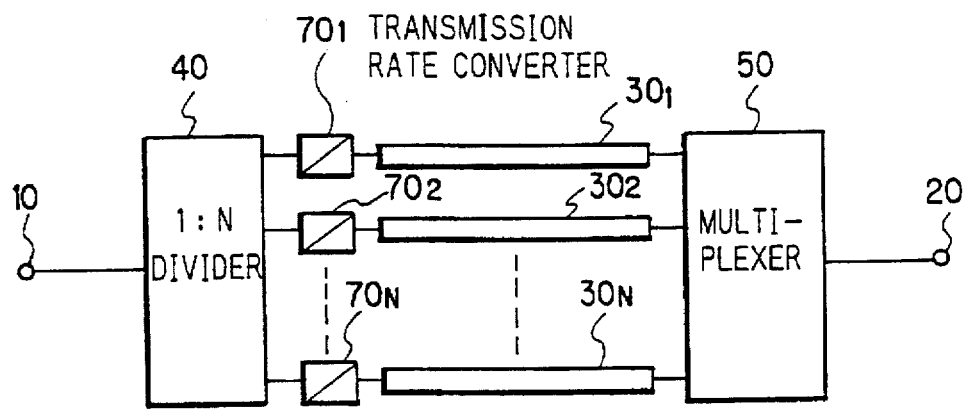
FIG. 2 shows a second embodiment of the high rate data transmission circuit according to the present invention.
Figure 6:
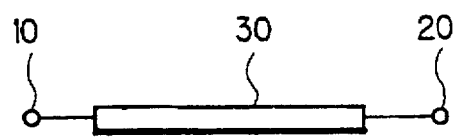
FIG. 6 schematically shows a prior art high rate data transmission circuit.

FIG. 2 shows a second embodiment of the high rate data transmission circuit according to the present invention.

Referring to FIG. 2, the second embodiment of the high rate data transmission circuit is the same as the first embodiment shown in FIG. 1 except that data transmission rate converters $70_1$, $70_2$, ..., $70_N$ are provided in lieu of the phase controllers $60_1$, $60_2$, ..., $60_N$. Again in FIG. 2, N is shown to be 3 or above for the convenience of the illustration, but N may be 2 or a greater integer.

FIG. 5 is a time chart in a case where the division number of the high rate data transmission circuit in FIG. 2 is 4, i.e., where the high rate data signal entered from the input terminal 10 is divided into four divisions.

Referring to FIG. 5, the 1:N divider 40 samples the high rate data signal 92 supplied from the input terminal 10 under control of a clock signal (not shown). The high rate data signal 92 is divided into four division data signals $93_1$ to $93_4$.

The division data signals $93_1$ to $93_4$ are converted to transmission rates with periods $T_1$ to $T_4$, sequentially. The periods $T_1$ to $T_4$ are all approximately N (approximately 4 in this embodiment) times the period $T_0$ of the high rate data signal 92. In this embodiment, the periods $T_1$ to $T_4$ are different from one another and $1/T_1+1/T_2+1/T_3+1/T_4 < 1/T_0$. In FIG. 5, the shaded portions are unused area.

Thus, again with the second embodiment of the high rate data transmission circuit, compared with the case where a single transmission line is used (i.e., N=1), it is possible to reduce the radiated noise E to be less than 1/N.

As has been described in the foregoing, the high rate data transmission circuit according to the present invention comprises a 1:N divider for dividing an input high rate data signal into N or at least 2 division data signals, phase controllers each for providing a phase difference to each of the N division data signals, N transmission lines for transmitting the respective N division data signals, and a multiplier for multiplexing the transmitted N division data signals into a single high rate data signal to be output. Thus, the N division data signals are of 1/N of the transmission rate of the high rate data signal and have mutual phase differences. It is thus possible to reduce the radiated noise to be the usual 1/N or less, that is, it is possible to reduce the radiated noise such as to satisfy the EMC standard.

Further, by varying the transmission rate of the N division data signals by providing transmission rate converters, it is possible to reduce the radiated noise to 1/N or less.

Further, since there is no need of reducing signal current or loop area, it is possible to cope with external noise and also with physical restrictions on the circuit design.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A high rate data transmission circuit comprising:
   a 1:N divider for dividing an input high rate data signal having a frequency into N (N being an integer of 2 or greater) division data signals;
   a data transmission rate converter for converting the transmission rate of each of the N division data signals such that the sum of frequencies corresponding to the converted transmission rates of the N division data signals is less than the frequency of the input high rate data signal; and
   a multiplexer for multiplexing the transmitted N division data signals into a single high rate data signal.

2. The high rate data transmission circuit of claim 1, wherein each of the N division data signals has a different converted transmission rate.

3. A method for high rate data transmission comprising:
   dividing an input high rate data signal having a frequency into N (N being an integer of 2 or greater) division data signals;
   converting the transmission rate of each of the N division data signals such that the sum of frequencies corresponding to the converted transmission rates of the N division data signals is less than the frequency of the input high rate data signal; and
   multiplexing the transmitted N division data signals into a single high rate data signal.

4. The method for high rate data transmission of claim 3, wherein each of the N division data signals has a different converted transmission rate.

* * * * *